US011856006B2

(12) United States Patent
Koyama et al.

(10) Patent No.: US 11,856,006 B2
(45) Date of Patent: Dec. 26, 2023

(54) ABNORMAL COMMUNICATION DETECTION APPARATUS, ABNORMAL COMMUNICATION DETECTION METHOD AND PROGRAM

(71) Applicant: NIPPON TELEGRAPH AND TELEPHONE CORPORATION, Chiyoda-ku (JP)

(72) Inventors: Takuma Koyama, Musashino (JP); Yasushi Okano, Musashino (JP); Masashi Tanaka, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 289 days.

(21) Appl. No.: 16/761,040

(22) PCT Filed: Nov. 14, 2018

(86) PCT No.: PCT/JP2018/042080
§ 371 (c)(1),
(2) Date: May 1, 2020

(87) PCT Pub. No.: WO2019/102911
PCT Pub. Date: May 31, 2019

(65) Prior Publication Data
US 2021/0178995 A1    Jun. 17, 2021

(30) Foreign Application Priority Data
Nov. 27, 2017    (JP) .................................. 2017-226556

(51) Int. Cl.
*H04L 9/40*        (2022.01)
*G06N 20/20*       (2019.01)
(Continued)

(52) U.S. Cl.
CPC ...... *H04L 63/1408* (2013.01); *B60R 16/0232* (2013.01); *G06F 18/217* (2023.01); *G06N 20/20* (2019.01)

(58) Field of Classification Search
CPC .............. B60R 16/0232; B60R 16/023; G06K 9/6262; G06N 20/20; G06F 21/577;
(Continued)

(56) References Cited

U.S. PATENT DOCUMENTS

2016/0350657 A1    12/2016  Gupta et al.

OTHER PUBLICATIONS

Anatolij Bezemskij, et al., "Behaviour-Based Anomaly Detection of Cyber-Physical Attacks on a Robotic Vehicle" 2016 15th International Conference on Ubiquitous Computing and Communications and 2016 8th International Symposium on Cyberspace and Security, XP 33048783, 2016, pp. 61-68.

(Continued)

*Primary Examiner* — Qian Yang
(74) *Attorney, Agent, or Firm* — Oblon, McClelland, Maier & Neustadt, L.L.P.

(57) ABSTRACT

There is provided an abnormal communication detection apparatus capable of reducing over-detection. The abnormal communication detection apparatus includes: a receiving part receiving communication data for learning that includes an identifier and communication data for detection that includes the identifier; a knowledge information acquiring part acquiring knowledge information that is information about at least either temporal characteristics or payload characteristics of the communication data for learning; an allocation rule generating part generating allocation rules that are rules for specifying which communication data having which identifier is to be allocated to which detector among a plurality of detectors, based on the knowledge information; an allocating part allocating the communication data to any of the detectors based on the allocation rules;

(Continued)

and the plurality of detectors each of which learns, when the communication data for learning is allocated, a model for detecting whether the communication data allocated to the detector is normal or abnormal, and detects, when the communication data for detection is allocated, whether the communication data for detection is normal or abnormal based on the learned model.

13 Claims, 8 Drawing Sheets

(51) Int. Cl.
*B60R 16/023* (2006.01)
*G06F 18/21* (2023.01)

(58) Field of Classification Search
CPC . H04L 2012/40215; H04L 2012/40273; H04L 63/1433; H04L 63/1408
See application file for complete search history.

(56) References Cited

OTHER PUBLICATIONS

Schappin Colin., "Intrusion Detection on the Automotive CAN Bus, Master's Thesis" Eindhoven University of Technology, Department of Mathematics and Computer Science Security Group, XP 55778540, May 2017, 80 pages.
Tao Zhang, et al., "Defending Connected Vehicles Against Malware: Challenges and a Solution Framework" EEE Internet of Things Journal, vol. 1, No. 1, XP 11547490, Feb. 2014, pp. 10-21.
International Search Report dated Dec. 18, 2018 in PCT/JP2018/042080 filed on Nov. 14, 2018, 1 page.
Ujiie et al., "Proposal of CAN Filtering Technology for In-Vehicle Network," The Institute of Electronics, Information and Communication Engineers, The $32^{nd}$ Symposium on Cryptography and Information Security, Jan. 2015, pp. 1-7 (with partial English translation) (total 9 pages).
Tanabe et al., "Proposal of Multi-Layer Cooperative CAN Filtering Technology for In-Vehicle Gateway ECU," The Institute of Electronics, Information and Communication Engineers, 2016 Symposium on Cryptography and Information Security, Jan. 2016, pp. 1-8 (with partial English translation) (total 11 pages).

ABNORMAL COMMUNICATION DETECTION APPARATUS, ABNORMAL COMMUNICATION DETECTION METHOD AND PROGRAM

TECHNICAL FIELD

The present invention relates to an abnormal communication detection apparatus, an abnormal communication detection method and a program for performing detection of abnormal communication due to attack communication or the like in a network, for example, mounted on machines such as vehicles, machine tools, construction machines and agricultural machines, in communication apparatuses connected to the network, and in a communication system configured with the network and the communication apparatuses.

BACKGROUND ART

Among machines such as vehicles (automobiles, special vehicles, motorcycles, bicycles and the like), machine tools, construction machines and agricultural machines, there are some that are mounted with a plurality of electronic control units (ECU). As a representative used for a communication network among the ECUs, Controller Area Network (CAN) exists. A network configuration of CAN is a so-called bus-type configuration in which a communication line for the ECUs is shared. As a communication procedure in the bus of the ECUs, CSMA/CR (Carrier Sense Multiple Access/Collision Resolution), that is, a procedure in which, when a communication collision occurs, high-priority communication is not influenced by the collision, but low-priority communication is resent is used. An ID is included in communication of each ECU on CAN, and the ID is used to identify priority order for communication mediation, content of data, a transmitting node and the like.

The risk of cyber attacks against these machine control information communication network is suggested. It is known that, by inserting attack transmission of an ID related to an attack target function by means such as unauthorized ECU connection to a network and unauthorized operation rewriting against an existing ECU, an unauthorized operation of the target function can be induced.

As methods for detecting such an attack and abnormal communication, for example, Non-patent literature 1 and Non-patent literature 2 exist. In Non-patent literature 1, a plurality of detectors (referred to as filters in the literature) having different judgment indexes are combined to judge whether each communication is abnormal or not. Non-patent literature 1 proposes a detector using an ID of communication, a DLC (Data Length Code; a CAN header field showing a payload length of the communication), a transmission cycle (or transmission frequency) as indexes. Non-patent literature 2 proposes a method that is the method of Non-patent literature 1 in which the number of kinds of detectors is increased. In both methods, normal/abnormality judgment of communication is performed by an AND condition of judgments by the detectors. For example, in the method of Non-patent literature 1, a judgment is made with a detector using IDs first, only communication judged as normal is judged with a detector using DLCs, and, furthermore, only communication judged as normal is judged with a detector using transmission cycles (or transmission frequency). All the detectors in both methods assume that vehicle specifications are already known. For example, a detector using a fixed data field, which is proposed by Non-patent literature 2, uses payload bit assignment (specifications about whether bits from a certain position to another certain position are a fixed value or a variable, an upper limit and a lower limit if the bits are variables, and the like) for each ID as a judgment index, and judges data, which is originally data of fixed values, as abnormal if the data has values different from the specifications.

PRIOR ART LITERATURE

Non-Patent Literature

Non-patent literature 1: "Proposal of CAN Filtering Technology for In-Vehicle Network."; Yoshihiro Ujiie, Takeshi Kishikawa, Tomoyuki Haga, Hideki Matsushima, Masato Tanabe, Yoshihiko Kitamura, Jun Anzai; Symposium on Cryptography and Information Security SCIS 2015, Jan. 20-23, 2015.

Non-patent literature 2: "Proposal of Multi-Layer Cooperative CAN Filtering Technology for In-Vehicle Gateway ECU"; Masato Tanabe, Jun Anzai, Manabu Maeda, Yoshihiro Ujiie, Hideki Matsuhima, Toru Wakabayashi; Symposium on Cryptography and Information Security SCIS 2016, Jan. 19-22, 2016.

SUMMARY OF THE INVENTION

Problems to be Solved by the Invention

In a conventional abnormality detection method, since it is judged whether communication is normal or not, by an AND condition of all detection results, the judgment result indicates abnormal if any of detectors detects the communication as abnormal. That is, since any of the detectors performs misdetection (wrongly detects normal communication as abnormal), the communication is judged as abnormal. Therefore, there is a problem that normal communication is easily detected as abnormal (over-detection, a Type I error).

Therefore, in the present invention, it is an object to provide an abnormal communication detection apparatus capable of reducing over-detection.

Means to Solve the Problems

An abnormal communication detection apparatus of the present invention includes a receiving part, a knowledge information acquiring part, an allocation rule generating part, an allocating part and a plurality of detectors.

The receiving part receives communication data for learning that includes an identifier and communication data for detection that includes the identifier. The knowledge information acquiring part acquires knowledge information that is information about at least either temporal characteristics or payload characteristics of the communication data for learning. The allocation rule generating part generates allocation rules that are rules for specifying which communication data having which identifier is to be allocated to which detector among a plurality of detectors, based on the knowledge information. The allocating part allocates the communication data to any of the detectors based on the allocation rules. Each of the plurality of detectors learns, when the communication data for learning is allocated, a model for detecting whether the communication data allocated to the detector is normal or abnormal, and detects, when the communication data for detection is allocated, whether the communication data for detection is normal or abnormal based on the learned model.

Effects of the Invention

According to an abnormal communication detection apparatus of the present invention, it is possible to reduce over-detection.

DETAILED DESCRIPTION OF THE EMBODIMENTS

Figure 1:
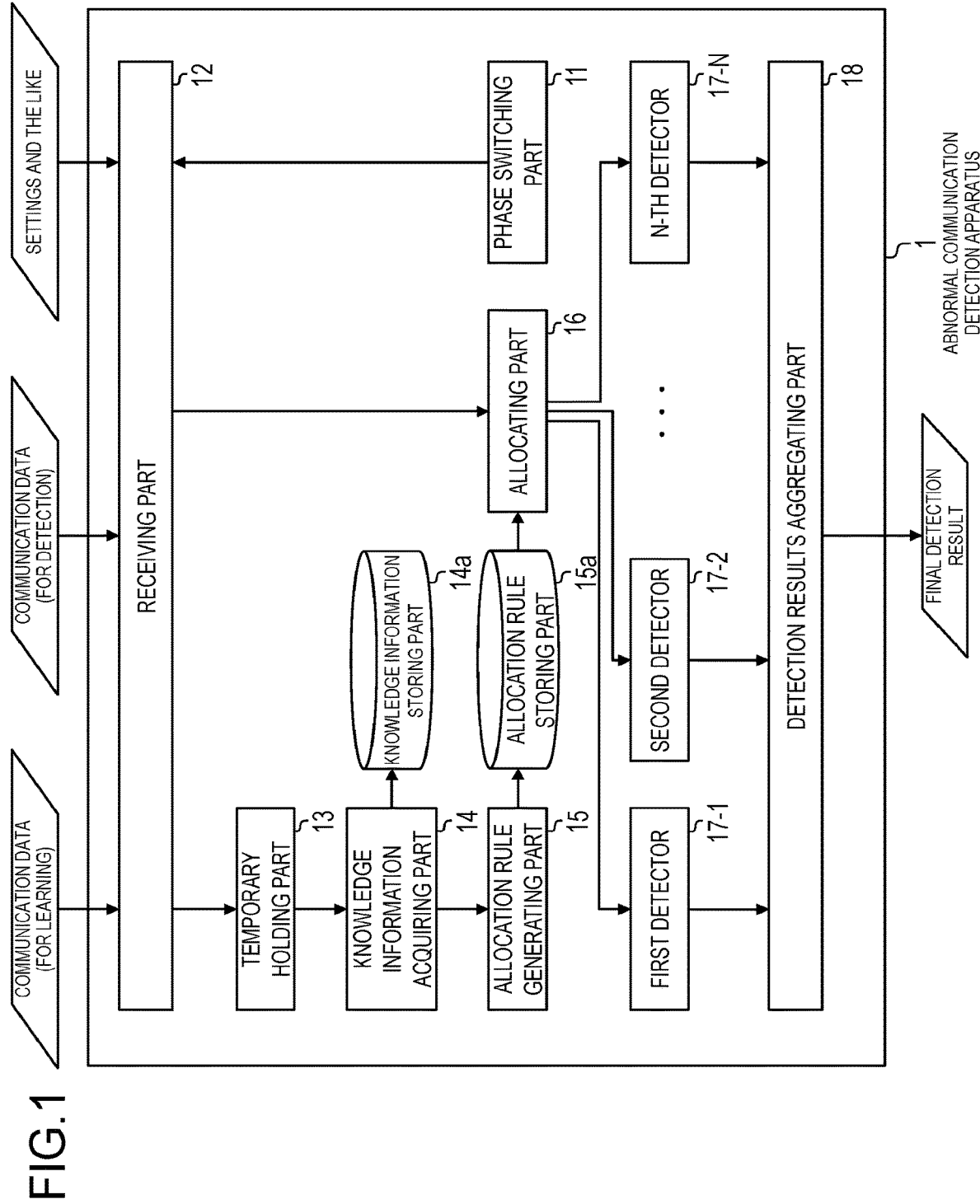
FIG. 1 is a block diagram showing a configuration of an abnormal communication detection apparatus of a first embodiment.

Embodiments of the present invention will be described below in detail. Component parts having the same functions will be given the same reference numerals, and duplicate description will be omitted.

Hereinafter, there may be a case where description is made on the assumption that CAN (Controller Area Network) is used as a communication network protocol. However, the communication network protocol for the abnormal communication detection apparatus of the present invention to perform detection of abnormal communication is not necessarily limited to CAN. The abnormal communication detection apparatus of the present invention may target a communication network protocol other than CAN (for example, FlexRay, LIN (Local INterconnect Network) or In-Vehicle Ethernet) for abnormal communication detection.

In abnormal communication detection apparatuses and an abnormal communication detection method in the embodiments below, communication data is classified into some different groups according to behavior characteristics of communication (temporal characteristics such as transmission cycle and frequency of normal communication, or payload characteristics, or both of the two kinds of characteristics), based on interception of normal communication on a communication network or data strings obtained by the interception; one or more kinds of detectors according to characteristics of each group and learners required for improving detection accuracy are prepared; and learning and detection are performed for each group to comprehensively detect whether normal or abnormal based on a detection result for each group.

In the abnormal communication detection apparatuses and the abnormal communication detection method in the embodiments below, phases of three stages (a knowledge information acquisition phase/a learning phase/a detection phase) are executed. Each phase will be described.

<Knowledge Information Acquisition Phase>

In the knowledge information acquisition phase, either temporal characteristics or payload characteristics of communication data, or both of the two kinds of characteristics are learned, and communication is classified into some groups according to a learning result. A procedure for learning is referred to as knowledge information acquisition, and a learning result by the knowledge information acquisition (a classification result) is referred to as knowledge information. In the knowledge information, only each group and elements included in the group may be recorded. Various kinds of statistical information such as estimated values, averages and variances of the characteristics calculated in a process of learning each element may be recorded together. Rules for specifying which communication data having which identifier (an ID in the case of CAN) is to be allocated to which detector among a plurality of detectors based on the knowledge information are referred to as allocation rules.

An arbitrary method can be used as means for knowledge information acquisition. For example, if specifications of a target are known, knowledge information about characteristics such as transmission cycle, transmission frequency and payload bit assignment may be decided based on the specifications. On the other hand, if specifications are unknown, machine learning may be performed based on interception of normal communication or data strings acquired by the interception, and each characteristic may be modeled to acquire knowledge information. Furthermore, after knowledge information acquisition by machine learning, knowledge information may be acquired by a heuristic approach in which an algorithm and human judgment are combined, for example, fine adjustment of parameters of the knowledge information is manually performed.

In the case of using machine learning after knowledge information acquisition, an arbitrary algorithm may be used as a method for the learning. For example, in the case of CAN, communication can be classified into some types according to IDs by modeling transmission cycle characteristics based on normal communication. Specifically, by assuming appearance distribution of communication intervals of a cycle type ID, which is an ID of communication always transmitted in a constant cycle, and measuring, for distribution for each ID, a degree of match with the distribution for the cycle type ID, learning and classification are performed. A certain ID can be classified as the cycle type ID if the certain ID completely matches with the distribution of the cycle type ID, classified as a cycle+event type ID if the distribution of the certain ID almost matches with the distribution of the cycle type ID but has peculiar points that do not match, and classified as an event type ID if almost the distribution of the certain ID does not match with the distribution of the cycle type ID almost at all.

The cycle+event type ID refers to an ID of communication having cycle characteristics that the communication is transmitted in a constant cycle but is transmitted at a short interval (or at a long interval) exceeding a tolerance of the cycle only then by being triggered by some trigger (event). Similarly, the event type ID refers to an ID of communication having cycle characteristics of not having a constant cycle and being transmitted only then by being triggered by some event.

As the appearance distribution for the cycle type ID, arbitrary probability distribution such as normal distribution or gamma distribution may be used. Furthermore, the classification may be performed based on other temporal characteristics such as length of the communication interval, statistical information such as variance and skewness of communication intervals, and communication frequency within a predetermined time for the cycle type ID, and difference according to event occurrence characteristics for the cycle+event type ID. A result of combining a plurality of the above characteristics and performing fine classification may be set as the knowledge information.

In the case of CAN, payload bit assignment can be classified into some types. For example, in the case of CAN, classification into a fixed value field in which the value does not change at all, a continuous value field that shows sensor information such as vehicle speed and continuously changes, a state value field that shows any of states decided beforehand, such as a shift position, a counter filed that shows the number of transmissions, a checksum field to be used for communication error correction, and the like can be performed based on change characteristics of the payload. Furthermore, finer classification may be performed, for example, classification of the continuous value field into an unsigned continuous value field that takes only a positive number equal to or larger than zero for vehicle speed or the like, a signed continuous value field that takes a positive or negative value for a steering angle in the case of using a rudder angle at the time of traveling straight as a reference, and the like. As other classification examples, a rate of change in the value of a field, an average or variance of differences of the value when the value changes, a bit length of each field, and the like are given. Specifically, discrimination between communication having a state value field where the value necessarily changes every time and communication having a state value field where the value changes only one time while being performed ten times, or discrimination between communication having an 8-bit length continuous value field and communication having a 16-bit length continuous value field, and the like are given. In the case of performing machine learning of payload characteristics also, an arbitrary algorithm may be used similarly to the case of learning the transmission cycle characteristics.

Since an ID in header information can be used as an identifier to exclusively classify communication in the case of CAN, the procedure for knowledge information acquisition and the knowledge information have been described above based on the ID. However, classification may be performed based on an arbitrary identifier such as other header information, footer information, characteristics of a particular bit position characteristic of payload, or the like.

The allocation rules are decided in any of the following methods after deciding detectors to be mounted. First, if a group that each detector can detect accurately is known beforehand, the allocation rules are immediately decided when knowledge information is obtained. On the other hand, if it is not known which detector is good at detecting which group, the allocation rules may be determined after clarifying which detector can detect which group most accurately by preparing pseudo-attack communication data obtained by inserting an attack into normal communication data and applying the pseudo-attack communication data to each detector individually. Further, each group may be allocated to any one detector or may be allocated to a plurality of detectors. If one group is allocated to a plurality of detectors, processing for collecting a plurality of judgment results and comprehensively making a judgment is performed in the detection phase described later. The allocation rules may be realized as a table in which each detector and an identifier such as an ID are directly associated or may be realized as such that sets are associated with each other like a table recording which group having which characteristics each detector can detect, a table recording which ID belongs to each group or the like.

<Learning Phase>

In the learning phase, a normal (abnormal) model of each communication classified into each group is learned and generated based on only normal communication, or normal communication and abnormal communication, and knowledge information, using a learner corresponding to each mounted detector. For example, in a case where a system for performing detection for each ID based on a payload is mounted, it is possible to estimate a range or the like for each field in terms of which field position is easily attacked, in other words, where is a field position that must be learned, by using payload characteristics (bit assignment and various kinds of statistical information) recorded in the knowledge information, and, therefore, decision of a threshold for a learner and model generation become efficient.

Communication data for learning used for model learning for each detector may be the same as or different from communication data for learning used in the knowledge information acquisition phase.

<Detection Phase>

In the detection phase, when detection target communication is received in the communication network, communication data for detection is allocated to appropriate detectors according to the allocation rules, and each of the responsible detectors detects whether normal or abnormal. Since the communication is allocated to the optimal detectors (detectors with high detection accuracy) according to the allocation rules, it is possible to decrease an over-detection rate in comparison with the case of coupling all detectors to obtain a detection result. Each detector may output a judgment result about whether normal or abnormal, for one communication message or may output a result only when the detector judges communication as abnormal.

It is also possible to generate the allocation rules so that one piece of communication data is allocated to a plurality of detectors at the same time. In this case, detection results by the plurality of detectors are aggregated according to the judgment criteria below, and a final detection result is outputted based on the aggregated detection results. This operation can be performed by a detection results aggregating part described later.

In general, over-detection (Type I errors) increases when it is attempted to decrease overlooking (Type II errors), and overlooking (Type II errors) increases when it is attempted to decrease over-detection (Type I errors). A user decides a policy beforehand. For example, if it is desired to decrease overlooking as far as possible, a final detection result of the present apparatus (the present method) can be considered to show an abnormality if any detector detects an abnormality. On the other hand, if it is desired to decrease over-detection as far as possible, the final detection result of the present apparatus (the present method) can be considered to show an abnormality if all or more than half of allocated detectors detect an abnormality. As another method, by weighting each detector, multiplying each detection result by a corresponding weight, adding up the results and calculating an abnormality degree as a likelihood, the abnormality degree is considered as the final detection result.

First Embodiment

Hereinafter, a configuration of an abnormal communication detection apparatus of a first embodiment that detects abnormal communication from communication of each electronic control apparatus in a communication network will be described with reference to FIGS. 1 and 2. As shown in FIG. 1, an abnormal communication detection apparatus 1 of the present embodiment includes a phase switching part 11, a receiving part 12, a temporarily holding part 13, a knowledge information acquiring part 14, a knowledge information storing part 14a, an allocation rule generating part 15, an allocation rule storing part 15a, an allocating part 16, a first detector 17-1, . . . , an N-th detector 17-N, which are N (N is a natural number equal to or larger than two) detectors, and a detection results aggregating part 18.

Figure 2:
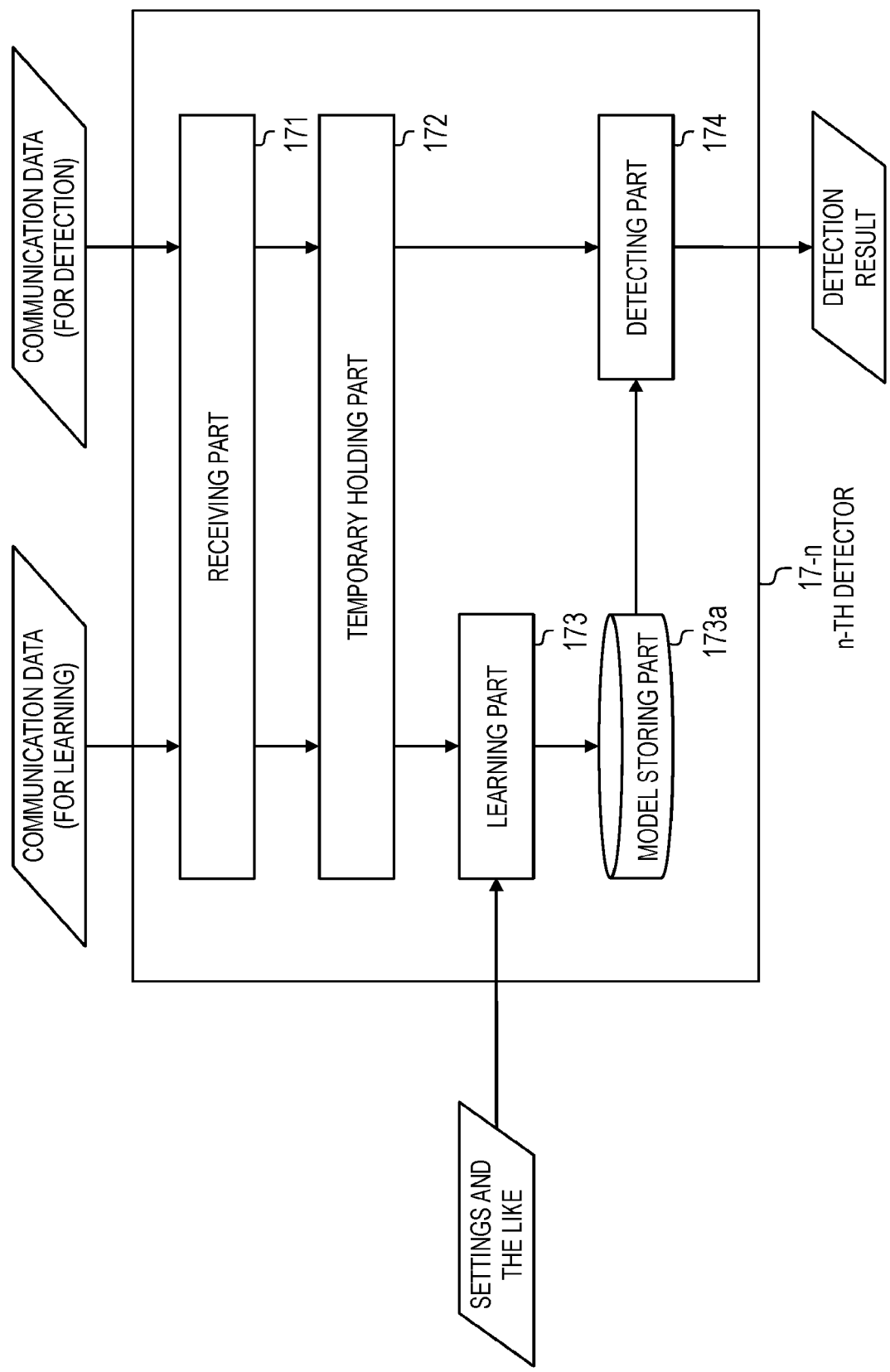
FIG. 2 is a block diagram showing a configuration of a detector of the first embodiment.

As shown in FIG. 2, an n-th detector 17-n (n=1, . . . , N) includes a receiving part 171, a temporarily holding part 172, a learning part 173, a model storing part 173a and a detecting part 174. The n-th detector 17-n may have components other than the components shown in FIG. 1 or may not have a part of the components shown in FIG. 1. For example, the receiving part 171 of the n-th detector 17-n may transmit communication data for learning directly to the learning part 173 not via the temporarily holding part 172 or may transmit the communication data for learning to the learning part 173 via the temporarily holding part 172.

In the description below, N=3 is assumed; it is assumed that the first detector 17-1 executes learning/detection only based on a transmission interval, which is a temporal characteristic; and it is assumed that the second detector 17-2 and the third detector 17-3 perform learning/detection based on both of a plurality of temporal characteristics and payload characteristics.

Further, in the description below, a case where both of the temporal characteristics and the payload characteristics are acquired as the knowledge information, and a case where communication data related to three different IDs (ID-a, ID-b and ID-c) is transmitted and received in a targeted network will be described.

Further, in the description below, a learner corresponding to each detector is realized as a learning part which is one function inside the detector. The apparatus will be described on the assumption of the above configuration, but the number and system of detectors to which the present invention is applicable, content of the knowledge information and a targeted network configuration are not limited.

Figure 3:
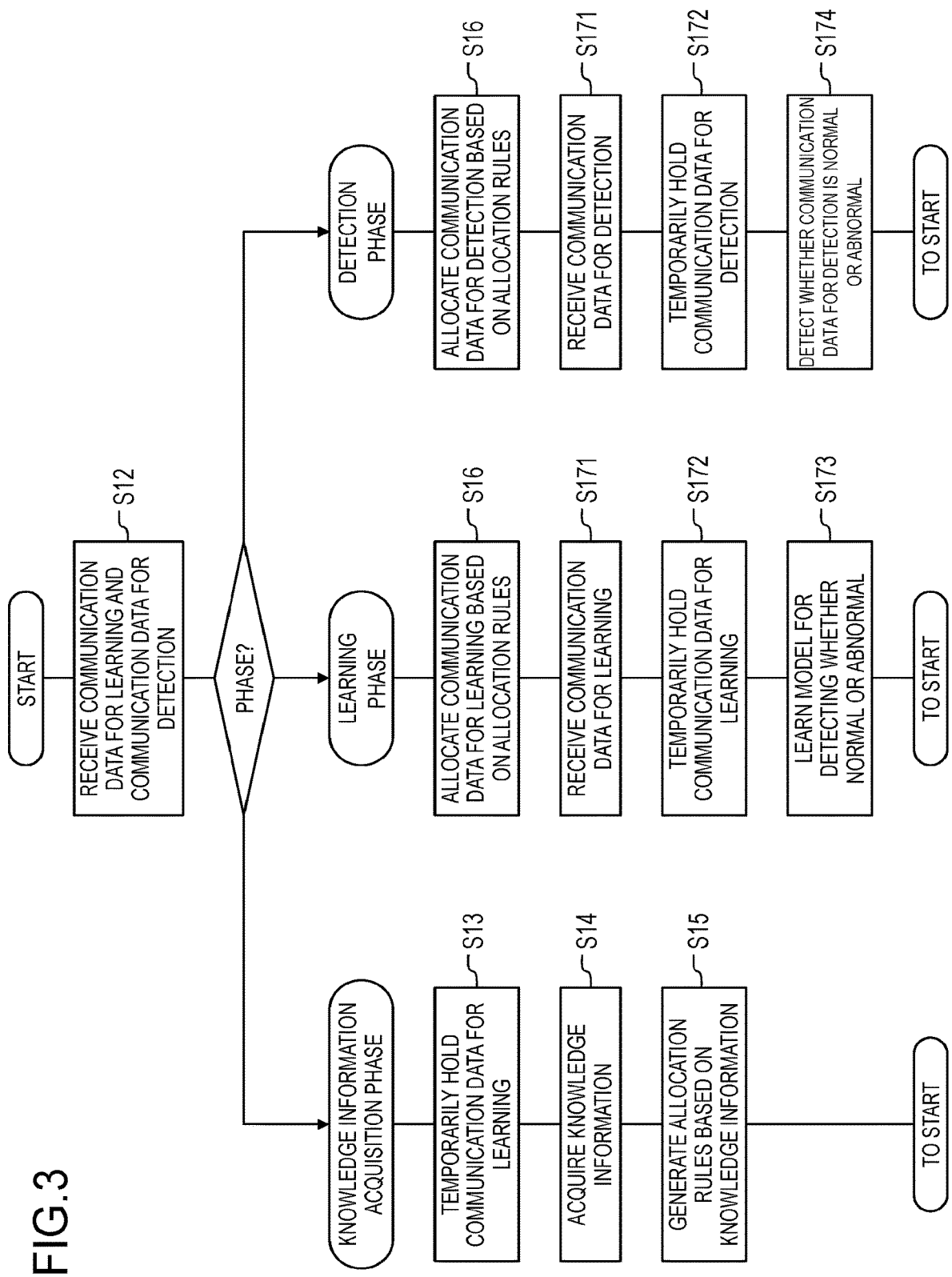
FIG. 3 is a flowchart showing an operation of the abnormal communication detection apparatus of the first embodiment.

An operation of the abnormal communication detection apparatus 1 will be described below with reference to FIG. 3. First, at each phase, the receiving part 12 receives communication data generated by communication on the communication network, processing of the communication or the like together with an identifier (an ID in the case of CAN) of the communication data and gives reception time to the communication data (S12). An operation of each component at each phase will be described below.

<Knowledge Information Acquisition Phase>

When the abnormal communication detection apparatus 1 is in the knowledge information acquisition phase or the learning phase, communication data received by the receiving part 12 is referred to as communication data for learning. In this case, the receiving part 12 transmits the communication data for learning to the temporarily holding part 13. The temporarily holding part 13 is assumed to have a storage capacity capable of holding at least one piece of communication data for learning up to all pieces of communication data for learning. The temporarily holding part 13 temporarily holds the communication data for learning received from the receiving part 12 (S13).

Next, based on the communication data for learning held in the temporarily holding part 13, the knowledge information acquiring part 14 acquires knowledge information, which is information about at least either temporal characteristics or payload characteristics of the communication data for learning according to a knowledge information acquisition method defined beforehand (S14). It is assumed that ID-a, ID-b and ID-c are judged to be of the cycle type, the cycle+event type, and the event type, respectively, based on a method of judging temporal characteristics based on a rate of change in difference among communication intervals. Furthermore, an arbitrary algorithm for estimating a payload field is applied, and it is assumed that payloads of ID-a, ID-b and ID-c are estimated to be configured with a fixed value and a continuous value, with a fixed value, a state value and a counter, and with a state value, a counter and a checksum, respectively. In this case, the knowledge information acquiring part 14 stores the result of grouping of the IDs and statistical information about each field into the knowledge information storing part 14a as knowledge information. If having stored knowledge information corresponding to communication data of all the IDs held in the temporarily holding part 13 into the knowledge information storing part 14a, the knowledge information acquiring part 14 gives a predetermined notification to the allocation rule generating part 15.

The allocation rule generating part 15 generates allocation rules based on the knowledge information, settings and the like (S15). For example, it is assumed that it is already known as prior knowledge that the first detector 17-1 exceeds the second detector 17-2 and the third detector 17-3 in accuracy of detecting a cycle type ID. Further, it is assumed that it is already known that the second detector 17-2 is a detector that uses change in a checksum of a payload. Further, it is assumed that it is already known that the third detector 17-3 is a detector that uses both of changes in a state value and a counter. In this case, the above prior knowledge is stored in the settings beforehand. The receiving part 12 receives the settings from an external apparatus or the like and transmits the received settings to the allocation rule generating part 15.

The allocation rule generating part 15 generates allocation rules which are rules for specifying which communication data having which identifier (ID) is to be allocated to which detector among the plurality of detectors, based on the knowledge information (S15). For example, the allocation rule generating part 15 generates an allocation rule of allocating communication data of ID-a, which has proved to be of the cycle type ID based on the knowledge information, to the first detector 17-1 based on the received settings. Similarly, the allocation rule generating part 15 generates an allocation rule of allocating communication data of ID-c, which is estimated to be configured with a state value, a counter and a checksum based on the knowledge information, to the second detector 17-2 based on the received settings. Similarly, the allocation rule generating part 15 generates an allocation rule of allocating communication data of ID-b, which is estimated to be configured with a fixed value, a state value and a counter, to the third detector 17-3 based on the received settings. The allocation rule generating part 15 stores the generated allocation rules into the allocation rule storing part 15*a* and transmits a processing completion notification to the phase switching part 11.

Receiving the processing completion notification from the allocation rule generating part 15, the phase switching part 11 erases content stored in the temporarily holding part 13 and switches the abnormal communication detection apparatus 1 to the learning phase. Alternatively, after erasing the content stored in the temporarily holding part 13, the phase switching part 11 requests the user of the abnormal communication detection apparatus 1 to switch the phase by some means.

<Learning Phase>

When the abnormal communication detection apparatus 1 is in the learning phase, the receiving part 12 receives pieces of communication data for learning and transmits the pieces of communication data for learning to the allocating part 16 one by one. The allocating part 16 judges to which detector each of the received pieces of communication data for learning is to be allocated to, based on IDs, based on the allocation rules stored in the allocation rule storing part 15*a*, and transmits the pieces of communication data for learning to allocation destination detectors (S16).

The receiving part 171 of the n-th detector 17-*n* receives communication data for learning allocated to the n-th detector 17-*n* (S171). The temporally holding part 172 of the n-th detector 17-*n* temporarily holds the received communication data for learning (S172). The learning part 173 of the n-th detector 17-*n* learns a model to detect whether communication data allocated to the n-th detector 17-*n* is normal or abnormal (S173).

For step S173 described above, an operation example when the communication data for learning of ID-a is allocated to the first detector 17-1 will be described. In this case, the learning part 173 of the first detector 17-1 learns a model of ID-a based on the received communication data for learning (S173). Specifically, since the communication data is given time of reception at the abnormal communication detection apparatus 1, the learning part 173 of the first detector 17-1 calculates transmission intervals between pieces of communication data, calculates a mean value, a variance and the like among the transmission intervals, and learns an ID-a transmission cycle model (including a threshold of the value) of normal communication data. When receiving a notification from the outside that all the communication data for learning of ID-a has been transmitted to the first detector 17-1, the learning part 173 of the first detector 17-1 stores the learned model into the model storing part 173*a* and transmits a notification to the phase switching part 11. Similarly to the first detector 17-1, each of the other detectors also learns a model (including a threshold) for communication data for learning of an ID the detector is responsible for. After receiving notifications from all the detectors, the phase switching part 11 switches the abnormal communication detection apparatus 1 to the detection phase. Alternatively, the phase switching part 11 requests the user of the abnormal communication detection apparatus 1 to switch the phase by some means.

<Detection Phase>

When the abnormal communication detection apparatus 1 is in the detection phase, communication data received by the receiving part 12 is referred to as communication data for detection. The receiving part 12 transmits received pieces of communication data for detection to the allocating part 16 one by one. The allocating part 16 judges which detector each of the received pieces of communication data for detection is to be allocated to, based on IDs, based on the allocation rules stored in the allocation rule storing part 15*a*, and transmits the pieces of communication data for detection to allocation destination detectors (S16).

The receiving part 171 of the n-th detector 17-*n* receives communication data for detection allocated to the n-th detector 17-*n* (S171). The temporally holding part 172 of the n-th detector 17-*n* temporarily holds the received communication data for detection (S172). The detecting part 174 of the n-th detector 17-*n* detects whether the communication data for detection is normal or abnormal based on the model learned at step S173 and stored in the model storing part 173*a* (S174).

For step S174 described above, when communication data for detection of ID-a is allocated to the first detector 17-1, the detecting part 174 of the first detector 17-1 determines a time difference between immediately previous communication data for detection of ID-a and the latest communication data for detection and detects whether normal or abnormal according to whether a short interval below a threshold in the model has occurred or not (S174). For step S174 described above, when communication data for detection of ID-c is allocated to the second detector 17-2, the detecting part 174 of the second detector 17-2 detects, based on a model in which the whole correspondence relationship between a state value and a checksum is stored, whether normal or abnormal according to whether the payload of the communication data for detection follows the model or not (S174). Further, for the step S174 described above, when communication data for detection of ID-b is allocated to the third detector 17-3, whether normal or abnormal is detected according to order of the state value and the counter of the immediately previous communication data for detection of ID-b and the latest communication data for detection of ID-b follows the model or not (S174).

Each detector transmits a detection result of the detecting part 174 to the detection results aggregating part 18 as needed. The detection results aggregating part 18 outputs a final detection result to the outside of the apparatus. Since communication data of each ID is allocated to each detector in the present embodiment, the detection results aggregating part 18 may output an output of each detector to the outside as it is, as an output of the abnormal communication detection apparatus 1 or may output the output, adding information (for example, information about when and which detector detected which message, and the like).

In each phase, the receiving part 12 may obtain communication data by a network or a gateway or may separately obtain communication data as data such as a log from another monitoring apparatus. The intercepted communication data is given time of reception of the communication data. If the reception time is already given to communication data such as a log, giving of the time may be omitted.

The abnormal communication detection apparatus 1 of the present embodiment may be provided with a function of, by receiving an input such as settings or predetermined communication, causing the phase switching part 11 to operate at an arbitrary timing to transition to an arbitrary phase. That is, the abnormal communication detection apparatus 1 of the present embodiment may transition to the knowledge information acquisition phase or the learning phase at an arbitrary timing even after having transitioned to the detection phase. At this time, according to algorithms of the knowledge information acquiring part 14 and the learning part 173, additional learning based on existing knowledge information and a normal model may be performed, or the existing knowledge information and the normal model may be erased to newly perform learning again.

The abnormal communication detection apparatus 1 of the present embodiment may be configured with a group of a plurality of devices each of which executes only each phase or may be configured with a combination of a plurality devices, for example by causing each detector to be an independent device. Further, the abnormal communication detection apparatus 1 of the present embodiment may be regarded as one of detectors so that a plurality of detection apparatuses may be configured to be in a nested state.

Second Embodiment

There is such communication that which detector the communication is allocated to changes according to difference among machine states, for example, states of a vehicle such as stop, traveling and automatic traveling. For example, for communication data from a vehicle, there is an ID that appears as the cycle+event type when the ignition of a vehicle is in an ON state but appears as the event type in an OFF state.

Figure 4:
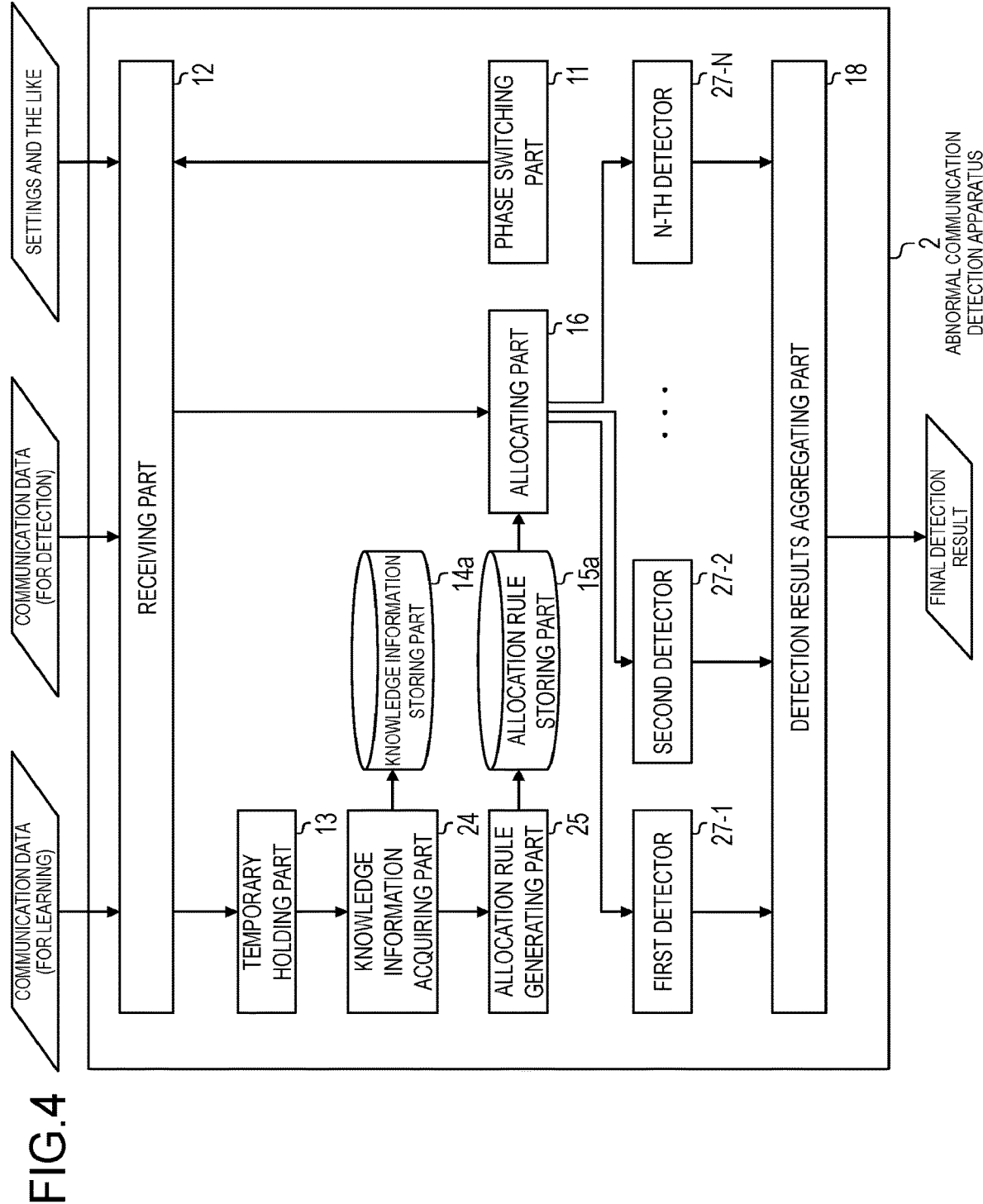
FIG. 4 is a block diagram showing a configuration of an abnormal communication detection apparatus of a second embodiment.

A configuration of an abnormal communication detection apparatus of a second embodiment that handles communication data transmitted from an electronic control apparatus having a plurality of machine states will be described below with reference to FIGS. 4 and 5. As shown in FIG. 4, an abnormal communication detection apparatus 2 of the present embodiment includes a phase switching part 11, a receiving part 12, a temporarily holding part 13, a knowledge information acquiring part 24, a knowledge information storing part 14a, an allocation rule generating part 25, an allocation rule storing part 15a, an allocating part 16, a first detector 27-1, . . . , an N-th detector 27-N, which are N (N is a natural number equal to or larger than two) detectors, and a detection results aggregating part 18. The components other than the knowledge information acquiring part 24, the allocation rule generating part 25, and the first detector 27-1, . . . , the N-th detector 27-N have the same functions as the first embodiment.

Figure 5:
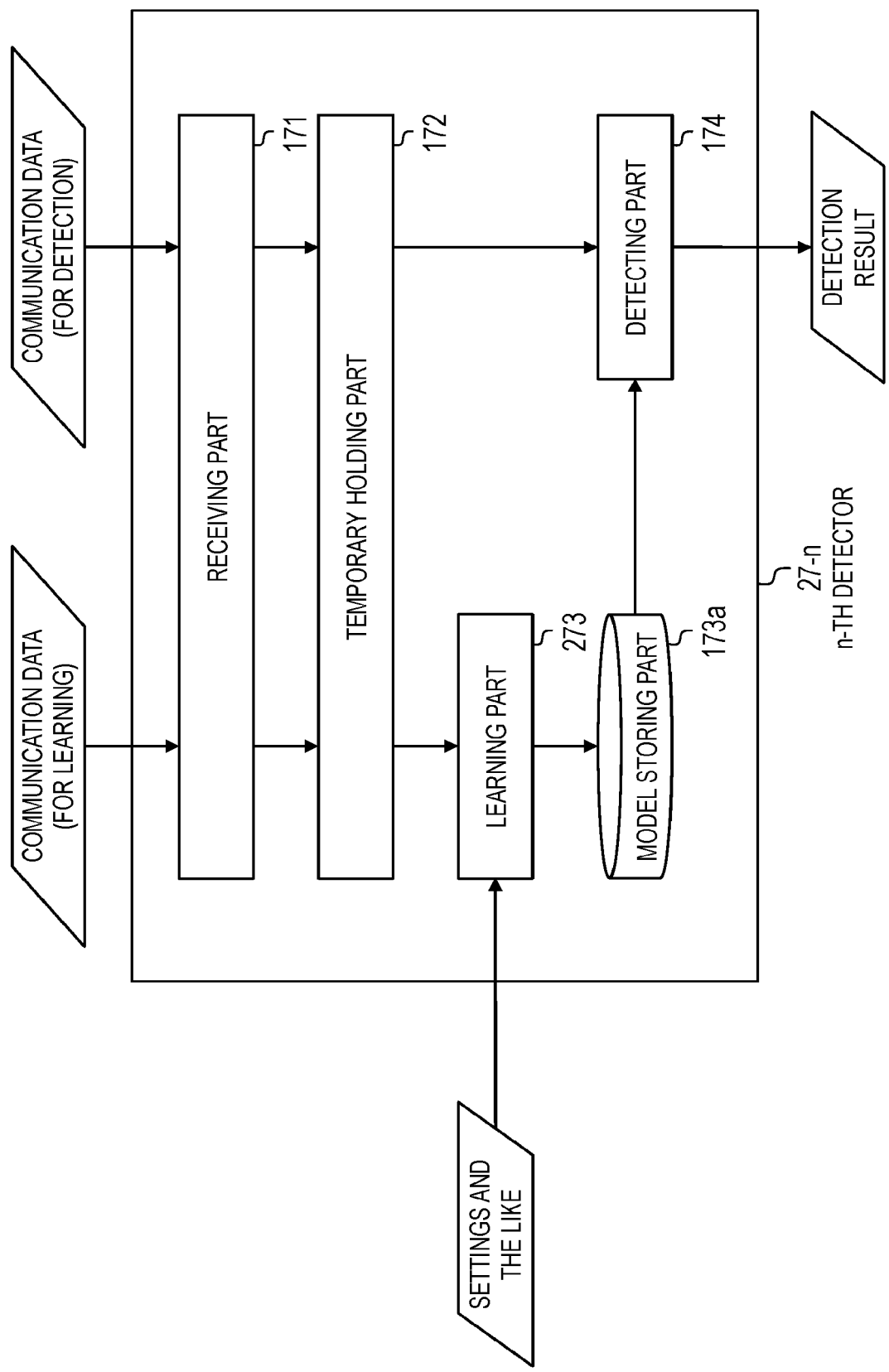
FIG. 5 is a block diagram showing a configuration of a detector of the second embodiment.

As shown in FIG. 5, an n-th detector 27-$n$ (n=1, . . . , N) includes a receiving part 171, a temporally holding part 172, a learning part 273, a model storing part 173a and a detecting part 174. The components other than the learning part 273 have the same functions as the first embodiment. Operations different from the first embodiment will be described below with reference to FIG. 6.

<Knowledge Information Acquisition Phase>

Figure 6:
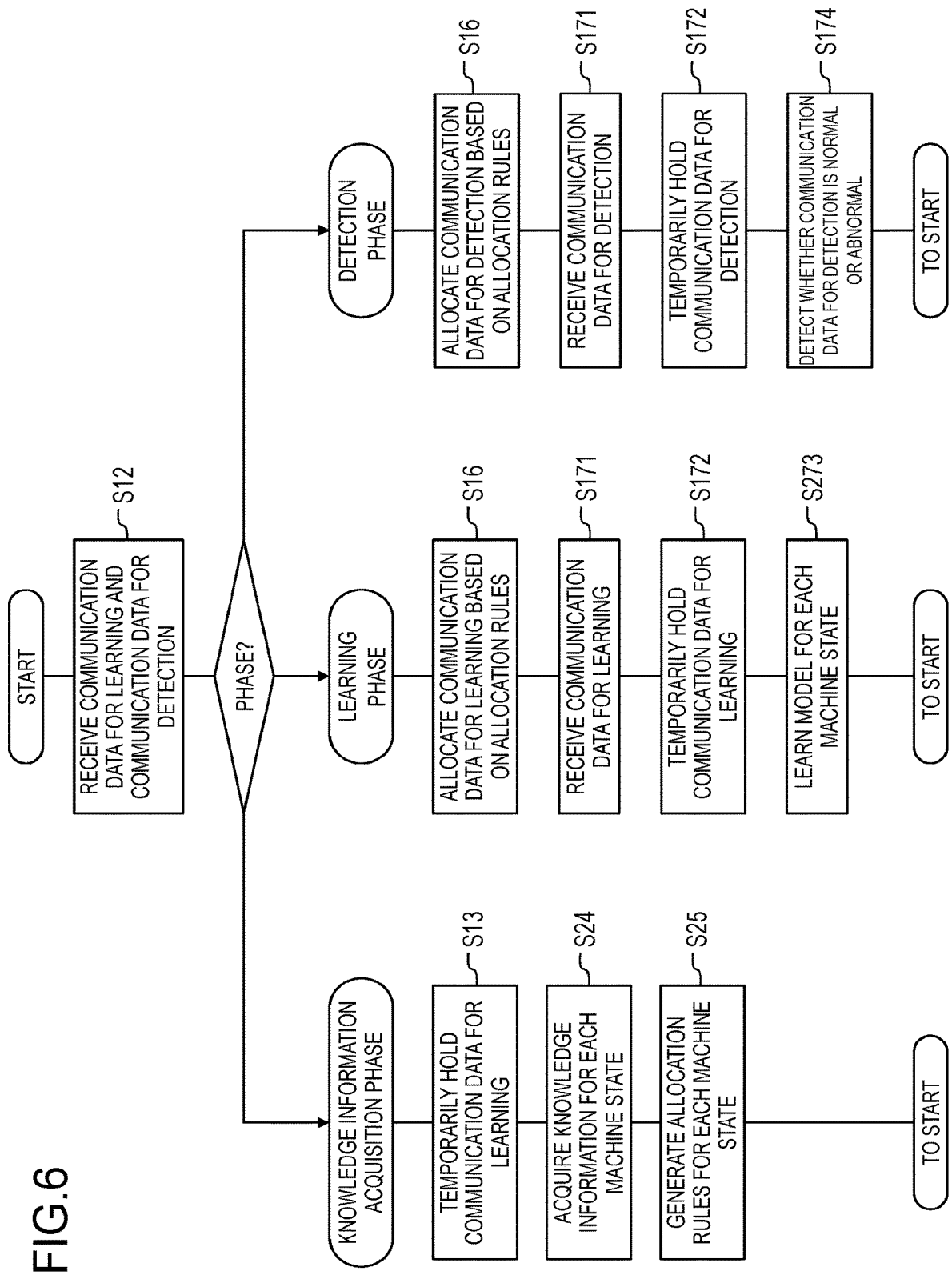
FIG. 6 is a flowchart showing an operation of the abnormal communication detection apparatus of the second embodiment.

As shown in FIG. 6, the knowledge information acquiring part 24 acquires knowledge information for each machine state (for example, two states of ON and OFF of an ignition) (S24), and the allocation rule generating part 25 generates allocation rules for each machine state (S25) and stores the allocation rules into the allocation rule storing part 15a.

<Learning Phase>

The learning part 273 of the n-th detector 27-$n$ learns a model for each machine state (S273) and stores the model into the model storing part 173a.

<Detection Phase>

The receiving part 12 receives communication showing a machine state or receives a setting showing the machine state. The allocating part 16 allocates communication data for detection to appropriate detectors based on the allocation rules generated at step S25, based on the received machine state (S16). Thereby, it is possible to perform abnormality detection for an ID the characteristics of which changes according to machine states.

Third Embodiment

There may be a case where, according to a configuration of a machine, combination of mounted detectors or the like, most of communication data belongs to one group and is allocated only to particular detectors. In a case where an abnormal communication detection apparatus is capable of performing parallel processing of a plurality of tasks, a case where detectors can be configured as independent apparatuses, or the like, processing time and a processing load required for learning and detection can be reduced or distributed by preparing a plurality of same learners and detectors.

Figure 7:
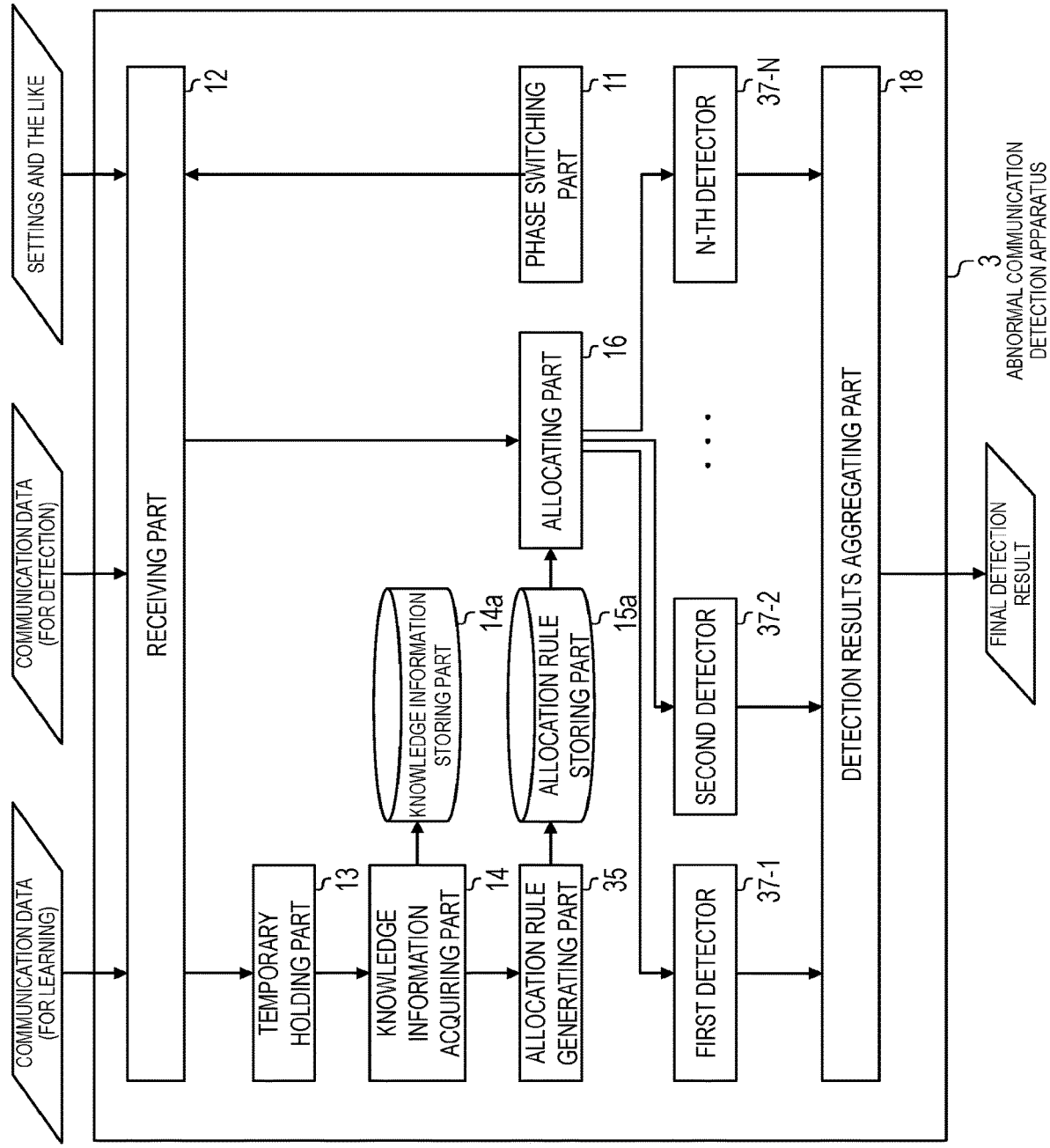
FIG. 7 is a block diagram showing a configuration of an abnormal communication detection apparatus of a third embodiment.
Figure 8:
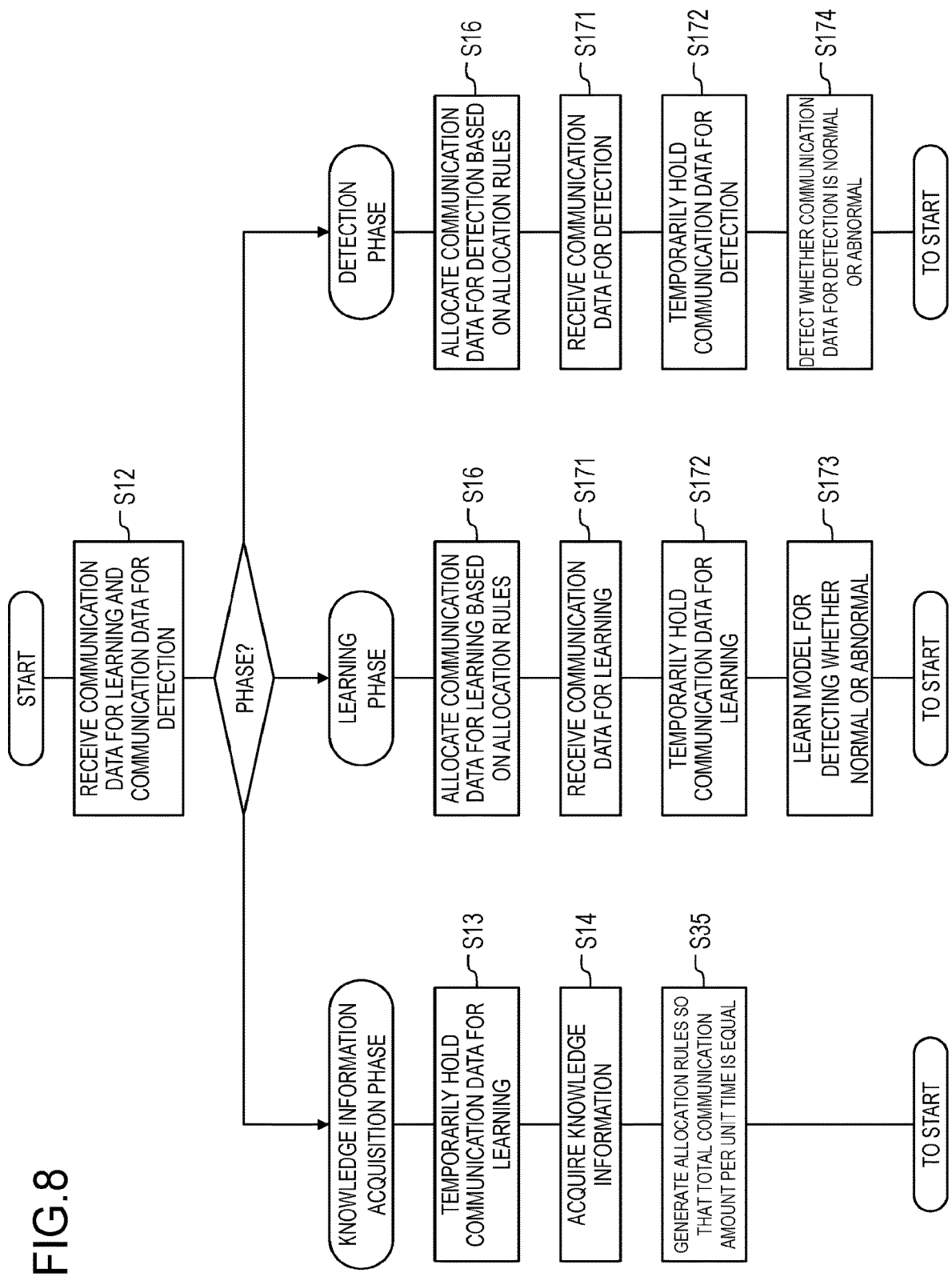
FIG. 8 is a flowchart showing an operation of the abnormal communication detection apparatus of the third embodiment.

A configuration of an abnormal communication detection apparatus of a third embodiment in which a plurality of same detectors are prepared will be described below with reference to FIG. 7. As shown in FIG. 7, an abnormal communication detection apparatus 3 of the present embodiment includes a phase switching part 11, a receiving part 12, a temporarily holding part 13, a knowledge information acquiring part 14, a knowledge information storing part 14a, an allocation rule generating part 35, an allocation rule storing part 15a, an allocating part 16, a first detector 37-1, . . . , an N-th detector 37-N, which are N (N is a natural number equal to or larger than two) detectors, and a detection results aggregating part 18. The components other than the allocation rule generating part 35, and the first detector 37-1, . . . , the N-th detector 37-N have the same functions as the first embodiment. It is assumed that, among the first detector 37-1, . . . , the N-th detector 37-N, a particular detector group, which is a group of m (2≤m≤N−1) detectors having the same performance, is included. Operations different from the first embodiment will be described below with reference to FIG. 8.

<Knowledge Information Acquisition Phase>

The allocation rule generating part 35 generates allocation rules so that a total communication amount of the communication data allocated to each of the detectors belonging to the particular detector group per unit time is equal (S35).

For example, it is assumed that there are two detectors having the same performance and belonging to the particular detector group, and these are referred to as detectors $E_1$ and $E_2$. A set of pieces of communication data for learning to be allocated to the particular detector group is referred to as a set F. It is assumed that transmission intervals of the pieces of communication data for learning included in the set F are different according to IDs.

For example, in order to equalize a load per detector belonging to the particular detector group (that is, in this case, in order to halve a load), the pieces of communication data for learning of the set F are divided into two groups according to the IDs first. Specifically, the IDs are classified so that the communication amount per unit time is equal (almost halved) based on transmission intervals of the IDs obtained from knowledge information, and a set $F_1$ of communication data for learning allocated to the detector $E_1$ and a set $F_2$ of communication data for learning to be allocated to the detector $E_2$ are obtained.

Therefore, the allocation rule generating part 35 generates the allocation rules so that communication data of IDs belonging to the set $F_1$ is allocated to the detector $E_1$, and communication data of IDs belonging to the set $F_2$ is allocated to the detector $E_2$. Thereby, it is possible to equalize and reduce a processing load on each of the detectors belonging to the particular detector group, and processing of the whole abnormal communication detection apparatus 3 becomes efficient. Similarly to the above, by generating the allocation rules so that pieces of communication data for learning are equally allocated to learners in a particular learner group, which is a group of a plurality of learners having the same performance, learning time for model generation and the like can be reduced.

[Effects of Abnormal Communication Detection Apparatuses 1 to 3 Described in First to Third Embodiments]

According to the abnormal communication detection apparatuses 1 to 3 described in the first to third embodiments, since whether normal or abnormal is detected using detectors with the highest detection accuracy according to knowledge information about acquired communication data (a result of learning behavior characteristics of communication, temporal characteristics such as transmission cycle and frequency of normal communication, or payload characteristics, or both of the two kinds of characteristics, and a result of classifying communication according to the learning result), it is possible to reduce over-detection and improve detection accuracy. Further, by preparing a plurality of detectors and allocating communication data to appropriate detectors according to IDs, detection accuracy is improved in comparison with the case of applying a single detector to the whole communication.

Further, according to the abnormal communication detection apparatuses 1 to 3 described in the first to third embodiments, by using knowledge information about each obtained piece of communication data, it is possible to learn a model using an appropriate learner and detector and detect whether communication data is normal or abnormal even without knowing design values and specifications about communication. Therefore, it is easy to apply the abnormal communication detection apparatuses 1 to 3 to various vehicle types and machines.

According to the abnormal communication detection apparatus 3 described in the second embodiment, detection accuracy is improved by appropriately using allocation rules according to machine states. Further, according to the abnormal communication detection apparatus 2 of the third embodiment, by equally allocating pieces of communication data to a group of a plurality of particular learners and a group of a plurality of particular detectors based on knowledge information about target communication and allocation rules, it is possible to distribute processing loads on the individual learners and detectors and perform equalization of the whole processing of the abnormal communication detection apparatus.

SUPPLEMENTARY NOTES

For example, as a single hardware entity, an apparatus of the present invention has an inputting part to which a keyboard or the like can be connected, an outputting part to which a liquid crystal display or the like can be connected, a communicating part to which a communication device (for example, a communication cable) communicable to the outside of the hardware entity can be connected, a CPU (Central Processing Unit; a cache memory, a register and the like may be provided), a RANI and a ROM which are memories, an external storage device which is a hard disk, and a bus connecting the inputting part, the outputting part, the communicating part, the CPU, the RAM, the ROM and the external storage device to enable data exchange among them. Further, the hardware entity may be provided with a device (a drive) or the like capable of reading from/writing to a recording medium such as a CD-ROM. As a physical entity provided with such hardware resources, there is a general-purpose computer, a built-in apparatus or the like.

In the external storage device of the hardware entity, programs required to realize the functions described above and data and the like required for processing of the programs are stored. (The storage is not limited to the external storage device. For example, the programs may be stored in the ROM which is a read-only storage device). Data and the like obtained by processing of the programs are appropriately stored in the ram or the external storage device.

In the hardware entity, each program stored in the external storage device (or the ROM or the like) and the data and the like required for processing of the program are read into the memory as necessary, and interpretation, execution and processing are appropriately performed by the CPU. As a result, the CPU realizes a predetermined function (each of the components represented above as . . . part, . . . means or the like).

The present invention is not limited to the above embodiments but can be appropriately changed within a range not departing from the spirit of the present invention. Further, the processes described in the above embodiments are not only executed in time series in order of the description but also may be executed in parallel or individually according to the processing capability of the apparatus that executes the processes or as necessary.

As already stated, in the case of realizing the processing functions of the hardware entity (the apparatus of the present invention) described in the above embodiments by a computer or a built-in apparatus, processing content of the functions that the hardware entity should have is written by a program. Then, by executing the program on the computer or the built-in apparatus, the processing functions of the hardware entity are realized on the computer or the built-in apparatus.

The program in which the processing content is written can be recorded in a recording medium readable by the computer or the built-in apparatus. As the recording medium readable by the computer or the built-in apparatus, anything, for example, a magnetic recording device, an optical disk, a magneto-optical recording medium or a semiconductor memory is possible. Specifically, for example, a hard disk device, a flexible disk, a magnetic tape or the like can be used as the magnetic recording device; a DVD (Digital Versatile Disc), a DVD-RAM (Random Access Memory), a CD-ROM (Compact Disc Read Only Memory), a CD-R (Recordable)/RW (ReWritable) or the like can be used as the optical disk; an MO (Magneto-Optical disc) or the like can be used as the magneto-optical recording medium; and an EEP-ROM (Electronically Erasable and Programmable-Read Only Memory) or the like can be used as the semiconductor memory.

Distribution of the program is performed, for example, by performing sales, transfer, lending or the like of a portable recording medium such as a DVD or a CD-ROM in which the program is recorded. Furthermore, a configuration is also possible in which the program is distributed by storing the program in a storage device of a server computer and transferring the program from the server computer to other computers or built-in apparatuses via a network.

For example, a computer or a built-in apparatus that executes such a program first temporarily stores the program recorded in a portable recording medium or transferred from a server computer into its own storage device. Then, at the time of executing processing, the computer or the built-in apparatus reads the program stored in its own storage medium and executes the processing according to the read program. Further, as another execution form of the program, a computer or a built-in apparatus may read the program directly from a portable recording medium and execute processing according to the program. Furthermore, each time a program is transferred to the computer from a sever computer, the computer or the built-in apparatus may sequentially execute processing according to the received program. Further, a configuration is also possible in which the above processing is executed by a so-called ASP (Application Service Provider) type service in which, without transferring the program from the server computer to the computer or the built-in apparatus, the processing functions are realized only by an instruction to execute the program and acquisition of a result. It is assumed that the program in this form includes information provided for processing by an electronic calculator, which is equivalent to a program (the information not being a direct command to the computer or the built-in apparatus but data or the like having a nature of specifying processing of the computer or the built-in apparatus).

Further, though it is assumed in this form that the hardware entity is configured by causing a predetermined program to be executed on a computer or a built-in apparatus, at least a part of the processing content may be realized as hardware.

What is claimed is:

1. An abnormal communication detection apparatus detecting abnormal communication from communication of each electronic control apparatus in a communication network, the abnormal communication detection apparatus comprising:
   processing circuitry configured to
      receive communication data for learning that includes an identifier and communication data for detection that includes the identifier,
      acquire knowledge information that is information about at least either temporal characteristics or payload characteristics of the communication data for learning,
      generate allocation rules under an OR condition that are rules for specifying which communication data having which identifier is to be allocated to which detector among a plurality of detectors, based on the knowledge information, wherein the knowledge information is information used to generate the allocation rules under the OR condition, the OR condition is a condition that does not combine a detection result of one detector with a detection result of another detector and is a condition for judging whether a corresponding operation is normal or abnormal based on a result of detection by only one detector, and the allocation rules under the OR condition are rules for allocating one piece of detection data to only one detector out of the plurality of detectors so as not to combine the detection result of one detector with the detection result of another detector, and
      allocate the communication data to any of the detectors based on the allocation rules; and
   the plurality of detectors each of which learns, when the communication data for learning is allocated, a model for detecting whether the communication data allocated to the detector is normal or abnormal, and detects, when the communication data for detection is allocated, whether the communication data for detection is normal or abnormal based on the learned model.

2. The abnormal communication detection apparatus according to claim 1, comprising
   a particular detector group that is a group of detectors having the same performance; wherein
   the processing circuitry generates the allocation rules so that a total communication amount of the communication data allocated to each of the detectors belonging to the particular detector group per unit time is equal.

3. The abnormal communication detection apparatus according to claim 2, wherein
   the processing circuitry
      generates the allocation rules so that the communication data is allocated to the plurality of detectors at the same time;
      aggregates detection results by the plurality of detectors for the communication data; and outputs a final detection result of the communication data based on the aggregated detection results.

4. The abnormal communication detection apparatus according to claim 2, wherein
   the processing circuitry
      generates the allocation rules so that the communication data is allocated to the plurality of detectors at the same time;
      aggregates detection results by the plurality of detectors for the communication data; and
      outputs a final detection result of the communication data based on the aggregated detection results.

5. The abnormal communication detection apparatus according to claim 1, wherein
   the processing circuitry
      generates the allocation rules so that the communication data is allocated to the plurality of detectors at the same time;
      aggregates detection results by the plurality of detectors for the communication data; and
      outputs a final detection result of the communication data based on the aggregated detection results.

6. An abnormal communication detection method for detecting abnormal communication from communication of each electronic control apparatus in a communication network, the abnormal communication detection method comprising:
   a receiving step of receiving communication data for learning that includes an identifier and communication data for detection that includes the identifier;
   a knowledge information acquiring step of acquiring knowledge information that is information about at least either temporal characteristics or payload characteristics of the communication data for learning;
   an allocation rule generating step of generating allocation rules under an OR condition that are rules for specifying which communication data having which identifier is to be allocated to which detector among a plurality of detectors, based on the knowledge information, wherein the knowledge information is information used to generate the allocation rules under the OR condition, the OR condition is a condition that does not combine a detection result of one detector with a detection result of another detector and is a condition for judging whether a corresponding operation is normal or abnormal based on a result of detection by only one detector, and the allocation rules under the OR condition are rules for allocating one piece of detection data to only one detector out of the plurality of detectors so as not to combine the detection result of one detector with the detection result of another detector;
   an allocating step of allocating the communication data to any of the detectors based on the allocation rules;

a learning step of learning, when the communication data for learning is allocated, a model for detecting whether the communication data allocated to the detector is normal or abnormal; and a detecting step of detecting, when the communication data for detection is allocated, whether the communication data for detection is normal or abnormal based on the learned model.

7. The abnormal communication detection method according to claim 6, wherein the allocation rule generating step generates the allocation rules so that a total communication amount of the communication data allocated to each of detectors belonging to a particular detector group that is a group of detectors having the same performance per unit time is equal.

8. The abnormal communication detection method according to claim 6, wherein the processing circuitry generates the allocation rules so that a total communication amount of the communication data allocated to each of detectors belonging to a particular detector group that is a group of detectors having the same performance per unit time is equal.

9. A non-transitory computer readable medium that stores a program causing a computer to function as the abnormal communication detection apparatus according to claim 1.

10. A non-transitory computer readable medium that stores a program causing a computer to function as the abnormal communication detection apparatus according to claim 2.

11. A non-transitory computer readable medium that stores a program causing a computer to function as the abnormal communication detection apparatus according to claim 5.

12. A non-transitory computer readable medium that stores a program causing a computer to function as the abnormal communication detection apparatus according to claim 3.

13. A non-transitory computer readable medium that stores a program causing a computer to function as the abnormal communication detection apparatus according to claim 4.

* * * * *